Figure 1:
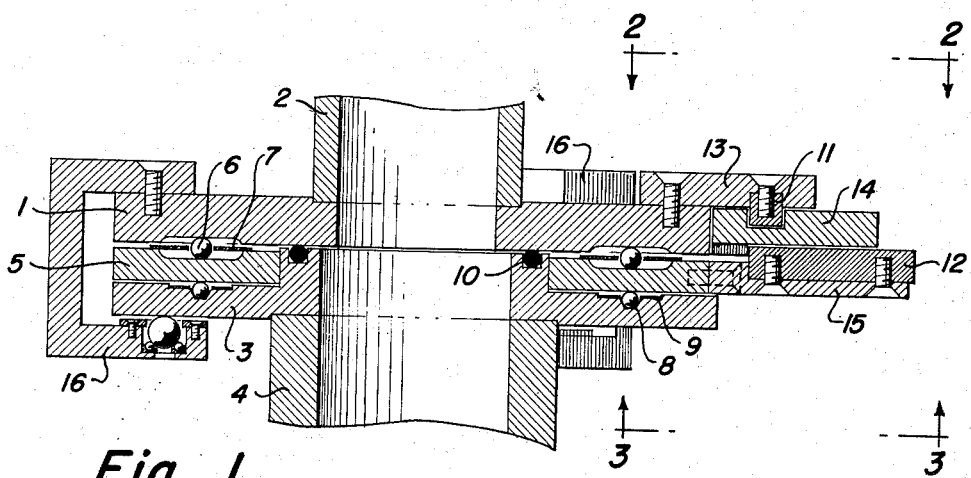

Sept. 21, 1954  J. J. WECHSLER  2,689,753
TRANSLATING, ROTATING BEARING DEVICE
Filed Dec. 8, 1953

WITNESSES:

INVENTOR:
Jacob J. Wechsler
BY

Patented Sept. 21, 1954

2,689,753

UNITED STATES PATENT OFFICE 2,689,753

TRANSLATING, ROTATING BEARING DEVICE

Jacob J. Wechsler, Los Alamos, N. Mex., assignor to the United States of America as represented by the United States Atomic Energy Commission Application December 8, 1953, Serial No. 397,059

4 Claims. (Cl. 285—96.8)

This invention relates to translating, rotating, bearing devices in general and more particularly to a device which allows translation and rotation, or any combination thereof, in parallel planes, of bodies under load. While not limited thereto, the present invention will be particularly described as applied to the problem of sealing a joint between conduits having parallel axes, or parallel faces at the joint, in which a pressure above or below atmospheric must be maintained, and in which the conduits are subjected to relative movement.

In varied applications it is necessary to maintain a loaded body in parallel relationship with a second body while allowing controlled translation of the bodies with respect to each other and free rotation in any translated position. For example, in an electron-microscope or a nuclear particle accelerator a vacuum-tight seal must be provided between the conduits connecting the chamber which contains the electron-emissive cathode and the chamber which contains the target upon which the electrons impinge. In addition, in the case of a nuclear particle accelerator such as the Van de Graaff type the junction or joint may be under a high compressive load. The conduits are subjected to frequent relative motion in order that the axis of the electron beam may be aligned with respect to the target.

In seals and joints of the prior art a yieldable gasket such as rubber is often used between the abutting faces of the conduits or bodies. If the compressive force is insufficient to maintain a sealed contact clamps are used to position the faces. Any friction fit such as is commonly used in the prior art, however, is unsatisfactory when the bodies are under high compressive load since the amount of friction makes frequent movement very difficult. Ball bearings between the two bearing surfaces having relative movement have been used but in the ball arrangements of the prior art the balls will eventually precess until no movement is possible.

Accordingly, it is an object of the present invention to provide a means for allowing continual free relative movement between two parallel surfaces under compressive load.

It is another object of the present invention to provide a new and improved gasket-type, vacuum-tight seal for conduits or chambers in which the junction of the conduits or chambers are subject to a combination of translatory and rotary movement.

It is a further object of the present invention to provide a low friction, freely movable connection between two bearing surfaces under compressive load.

Figure 2:
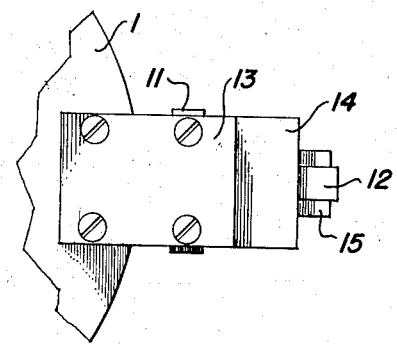
Figure 3:
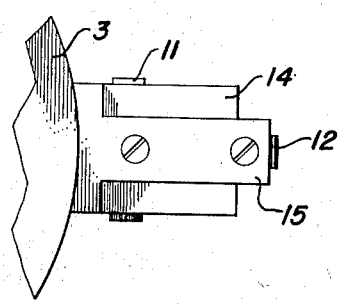

Other objects and advantages of the present invention will be apparent to those skilled in the art from the following description of a preferred embodiment as illustrated in the accompanying drawings made a part of this specification in which:

Figure 1 is a cross-sectional view in elevation of the present invention as applied to a gasket-type, vacuum-tight seal between axially aligned conduits, Figure 2 is a partial plan view taken along line 2—2 of Figure 1 looking down, and Figure 3 is a partial plan view taken along line 3—3 of Figure 1 looking up.

The translating, rotating mechanism described herein utilizes three parallel plate members separated one from the other by ball bearings and interconnected such that the first plate moves with respect to the second plate only in translation, and the second plate moves with respect to the third plate only in rotation, whereby a body affixed to, or mounted upon, the first plate may be moved in a plane parallel to a second body affixed to, or mounted upon, the third plate through any combination of straight lines and curves with no precessing of the ball bearings.

Referring to the drawings, similar reference numerals refer to like parts throughout the several drawings. Referring now particularly to Figure 1 a presently preferred embodiment of the present invention as applied to a sealed joint for conduits having parallel axes is shown.

The present invention comprises a translating plate 1 upon which the cylindrical body 2 to which relative movement is to be imparted is mounted, a stationary plate 3 upon which the stationary body 4 is mounted, and an annular ring 5 which provides the rotary motion of the assembly. The translating plate 1, the stationary plate 3 and the annular ring 5 are all maintained in parallel planes. In the presently preferred embodiment the translating plate 1 is a circular metallic plate having parallel faces and a circular perpendicular opening symmetrical about the center line of the translating plate 1 acting as an extension of the cylindrical body 2 mounted perpendicularly on the translating plate. In the lower face of the translating plate is an annular depression with the base of the depression parallel to the faces of the translating plate. The width of the depression, or the difference between the inside and outside diameters of the depression, is determined by the maximum amount of translatory movement desired between the movable body 2 and the stationary body 4.

The annular ring 5 has an outside diameter substantially equal to the outside diameter of the translating plate 1 and an inside diameter substantially greater than the diameter of the circular opening through the translating plate. The annular ring 5 is of finite thickness with the upper and lower faces parallel. In the upper face of the annular ring an annular depression is provided having a depth and inside and outside diameters equal to those of the depression in the lower face of the translating plate 1. The translating plate 1 and annular ring 5 are separated by a series of ball bearings 6 in a retaining ring 7. The ball bearings 6 are of a diameter sufficient to separate the plate 1 and ring 5 the amount necessary to allow the retaining ring 7 to move freely between them.

The stationary plate 3 has an outside diameter substantially equal to that of translating plate 1 and annular ring 5, and an inside diameter substantially equal to that of the cylindrical body 4 mounted on the outer face of the stationary plate 3. The inner face of the stationary plate is in two levels with a perpendicular shoulder therebetween. The perpendicular shoulder has a diameter substantially equal to, or slightly less than, the inside diameter of the annular ring 5, and is substantially equal in height to the distance from the inner face of the translating plate to the lower face of the annular ring when the translating plate and annular ring are properly positioned by the ball bearings 6. In the inner face of the stationary plate 3 a ball bearing race is provided to maintain the ball bearings 8 at a constant radius. A retaining ring 9 positions the ball bearings radially.

Thus, when the translating plate 1, stationary plate 3 and annular ring 5 are assembled all faces are parallel. The stationary plate 3 mates with the annular ring 5 so that the annular ring 5 is supported on the ball bearings 8. The high section of the inner face of the stationary plate 3 is positioned proximate the inner surface of the translating plate 1. In the illustrated embodiment in which a seal is desired, an O-ring seal 10 is provided between these surfaces. The translating plate 1 is thus positioned on the O-ring 10 and the ball bearings 6.

The translating plate 1 and annular ring 5 are interconnected by two keyway systems which allow movement between the translating plate and annular ring only in straight lines. In the presently preferred embodiment a key 11 is affixed to the translating plate 1 by means of a bracket 13. The key 11 extends below the outer surface of the translating plate and is positioned a finite distance from the circumference of the translating plate, parallel with a tangent to the circumference of the plate at the nearest point. A second key 12 is affixed to the annular ring 5 by means of a bracket 15. The key 12 extends above the inner face of the translating plate, and has its upper surface a finite distance below the lower face of the key 11 and is perpendicular to the key 11. A keyway block 14 is positioned between the bracket 13 and bracket 15 and contains the keyways for the keys 11 and 12. Thus, when the translating plate 1 and annular ring 5 are assembled with the keys 11 and 12 affixed and keyway block 14 in position, the keys and keyways restrict the movement of the translating plate to a combination of straight perpendicular lines with respect to the annular ring 5.

Clamps 16 may be provided to maintain the plates and annular ring in contact if the application for which the assembly is adapted is one in which the compressive load may be removed.

In operation, therefore, the translating plate 1 can move with respect to the annular ring only in translation by means of the perpendicular keys 11 and 12. The annular ring is retained by the shoulder and can only rotate with respect to the stationary plate. The movable body may thus be both translated and rotated with respect to the stationary body, but since each ball bearing race performs only a simple motion the problem of precessing or sliding of the balls is eliminated.

While a preferred embodiment as applied to sealed conduits has been described, it is to be understood that this is given as an example only. Various applications of the bearing device of the present application will be apparent to those skilled in the art, and the scope of the invention is to be determined by the objects and the claims.

What is claimed is:

1. A translating, rotating bearing device comprising a first, second and third plate members, said plates being in parallel planes and separated one from the other by ball bearings, said parallel plates being interconnected by guide means such that said first plate moves with respect to said second plate only in translation, and said second plate moves with respect to said third plate only in rotation.

2. A translating, rotating bearing device comprising a translating plate member, a rotating plate member, and a stationary plate member, said translating plate and said rotating plate being proximate in parallel planes and separated by confined ball bearings, said translating plate and said rotating plate interconnected by guide means which restrain the motion between said plates to translational relative motion; said rotating plate and said stationary plate being proximate in parallel planes and separated by confined ball bearings, said rotating plate and said stationary plate being interconnected by means which restrain said rotating plate and said stationary plate to relative rotational movement.

3. A translating, rotating bearing device comprising a translating plate, a rotating annular ring and a stationary plate, said translating plate and said rotating annular ring being positioned with adjoining faces proximate in parallel planes and separated by a circular series of positioned ball bearings, said translating plate and said rotating annular ring being interconnected by two keyways, the first of said keyways having a path of relative linear movement in the plane of the translating plate between said translating plate and said annular ring and the second of said keyways having a path of relative linear movement normal to the path of said first keyway in the same plane; said stationary plate having a circular shoulder substantially equal in diameter to the inside diameter of said annular ring and substantially equal in height to the thickness of said annular ring, said stationary plate mating with said annular ring, the proximate faces of said annular ring and said stationary plate being separated by a circular series of positioned ball bearings.

4. A laterally movable sealed joint comprising a translating plate member, a rotating annular ring member and a stationary plate member, a first conduit affixed to said translating plate, and a second conduit affixed to said stationary plate; said translating plate having a circular opening therethrough substantially equal to and concentric with the inside diameter of said first conduit, said stationary plate having a circular opening therethrough substantially equal to and concentric with the inside diameter of said second conduit; said stationary plate having a perpendicular circular shoulder concentric with said opening, said shoulder having an outside diameter substantially greater than said opening and a height substantially equal to the thickness of said annular ring, said annular ring having an inside diameter substantially equal to the outside diameter of said shoulder whereby said stationary plate mates with said annular ring, proximate faces of said annular ring and said stationary plate being separated by confined ball bearings; said translating plate and said annular ring being positioned with adjoining faces proximate in parallel planes and separated by confined ball bearings, said translating plate and said annular ring being interconnected by two keyways allowing linear movement in perpendicular paths in the plane of said translating plate; and a gasket seal between the adjoining face of said circular shoulder and said translating plate.

UNITED STATES PATENTS

References Cited in the file of this patent

| Number | Name | Date |
| --- | --- | --- |
| 1,862,220 | Johnson | June 7, 1932 |
| 1,907,447 | Schiltz | May 9, 1933 |
| 2,627,580 | Picard | Feb. 3, 1953 |
| 2,646,294 | Anderson | July 21, 1953 |